Jan. 22, 1963  J. R. WATTS  3,074,495
WEIGHING MACHINES
Filed June 17, 1958  8 Sheets-Sheet 1

INVENTOR
JOHN RAYMOND WATTS
BY
Irvin S. Thompson
ATTORNEY

Jan. 22, 1963  J. R. WATTS  3,074,495
WEIGHING MACHINES
Filed June 17, 1958
8 Sheets-Sheet 2

INVENTOR
JOHN RAYMOND WATTS
BY
ATTORNEY

Jan. 22, 1963    J. R. WATTS    3,074,495
WEIGHING MACHINES

Filed June 17, 1958    8 Sheets-Sheet 3

INVENTOR
JOHN RAYMOND WATTS
BY
Irwin S. Thompson
ATTORNEY

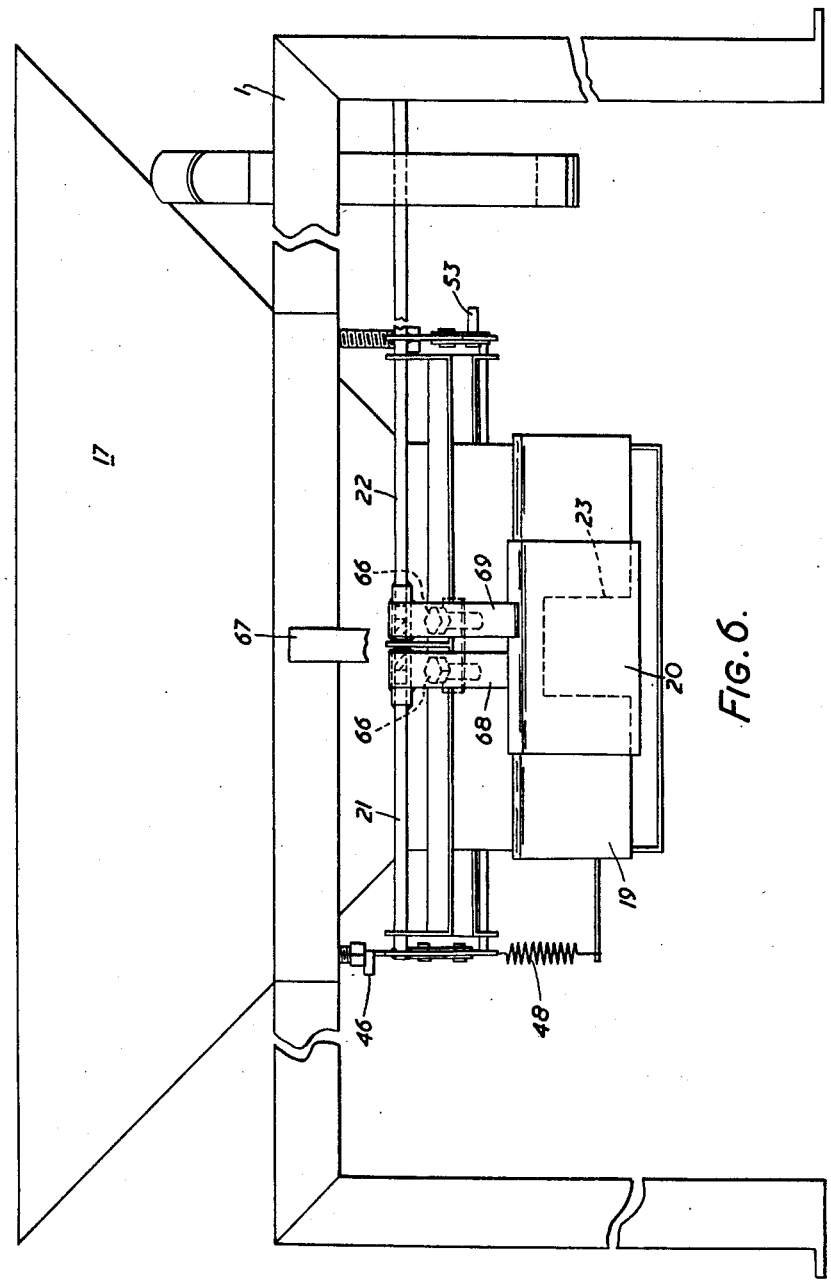

Jan. 22, 1963    J. R. WATTS    3,074,495
WEIGHING MACHINES
Filed June 17, 1958    8 Sheets-Sheet 5
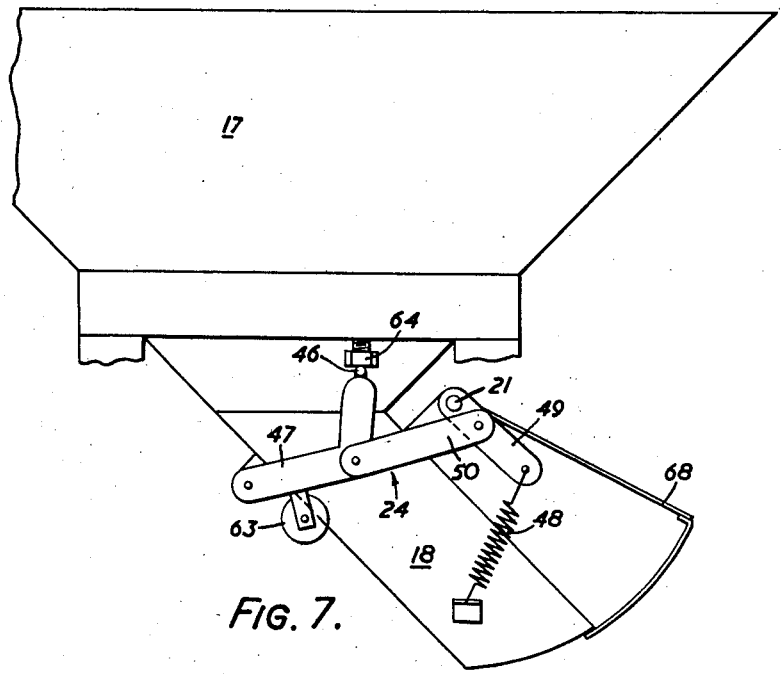
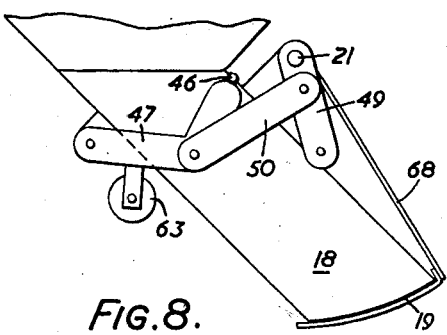
INVENTOR
JOHN RAYMOND WATTS
BY Irwin S. Thompson
ATTORNEY Jan. 22, 1963  J. R. WATTS  3,074,495
WEIGHING MACHINES
Filed June 17, 1958  8 Sheets-Sheet 6

INVENTOR
JOHN RAYMOND WATTS
BY
Irwin S. Thompson
ATTORNEY

Jan. 22, 1963  J. R. WATTS  3,074,495
WEIGHING MACHINES

Filed June 17, 1958  8 Sheets-Sheet 7

INVENTOR
JOHN RAYMOND WATTS
BY
Irwin S. Thompson
ATTORNEY

Jan. 22, 1963   J. R. WATTS   3,074,495
WEIGHING MACHINES
Filed June 17, 1958   8 Sheets-Sheet 8

INVENTOR
JOHN RAYMOND WATTS
BY
*Irwin S. Thompson*
ATTORNEY 3,074,495
WEIGHING MACHINES
John Raymond Watts, Rushy Downs Farm, Hawling, near Andoversford, Gloucestershire, England
Filed June 17, 1958, Ser. No. 742,647
Claims priority, application Great Britain June 20, 1957
3 Claims. (Cl. 177—87)

This invention relates to weighing machines.

According to the invention a weighing machine comprises means including a plurality of receptacles, said means being mounted on a weight-responsive element of the machine for movement which will present the receptacles in succession at a loading station, means for retaining one of said receptacles at the loading station when so presented, and means responsive to movement of the weight-responsive element which will release said retained receptacle when a predetermined weight of material has been loaded into the receptacle at the loading station and bring about movement in which the next succeeding receptacle will be presented at the loading station and the material loaded will be discharged from the loaded receptacle.

The receptacle loading means may comprise a container, the said receptacles comprising individual compartments of the container.

In many industries, particularly in the agricultural industry, weighing machines are required which will repeatedly and accurately weigh discrete predetermined quantities of material, for example during a bagging operation in which bags or sacks are filled in succession with uniform quantities of the material. Weighing machines are often required in the same industries for use in "bulk-weighing" and "continuous-weighing" operations; an example of the former operation is the weighing of a predetermined weight of material for transport in a truck or lorry, while an example of the latter operation is the weighing of the total quantity of material which is supplied to a silo for bulk storage. The invention provides a particularly convenient form of weighing machine which can readily be used with a high degree of accuracy in a bag-weighing operation and which, moreover, can readily be constructed so as to be usable also in bulk-weighing and continuous-weighing operations.

Preferably the container is pivotally mounted so as to be rotatable about the pivot axis and is so arranged that the center of mass of the material loaded into a compartment at the loading station is displaced to the side of the pivot axis of the container in the direction in which the latter is required to rotate. Due to this arrangement of the container as soon as it is released it turns about its pivot axis under gravity to tip the weighed contents of the loaded receptacle.

The rotary container preferably comprises a drum open at its periphery and divided by a plurality of substantially radial vanes equiangularly separated from each other about the pivot axis of the container, into a plurality of substantially sector-shaped compartments of equal capacity. Usually there will be three or more such radial vanes to form three or more of the substantially sector-shaped compartments, the latter being of 120°, 90°, 72° . . . included angle depending on whether 3, 4, 5 . . . vanes respectively are provided.

A hopper adapted to contain a supply of material is preferably provided at the loading station, means for controlling the supply of material from the outlet of the hopper into the container being responsive to movement of said weight-responsive element.

To achieve the aforesaid displacement of the centre of mass of the material to one side of the pivot axis of the container, the hopper outlet may be offset to one side of the pivot axis of the container, instead of the latter being vertically below such outlet. However, the permissible degree of such offsetting is strictly limited and, in order to reduce the offsetting to a minimum or avoid it altogether, the vane forming the rear wall (with respect to the direction of rotation of the container) of a compartment may be bent so that the radially outer portion of its length is inclined rearwardly to form, when the inner portion of its length is vertical as it preferably is when the compartment concerned is retained at the loading station, an inclined surface which is struck by material falling from the hopper and serves as a chute to direct the material forwardly of the pivot axis of the rotary container. Thereby piling of the material in the compartment is displaced from the pivot axis whereby the moment of the mass of the material about such axis is increased. Furthermore, the aforesaid rearward inclination of the rear wall of a given compartment automatically involves the rearward inclination of the front wall of the succeeding compartment as a result of which, with a given compartment retained at the loading station, its capacity is increased.

The flow of material from the hopper to the material-receiving compartment is preferably controlled by valve means which are associated with the hopper outlet and provide a main feed and a dribble feed in response to the degree of movement of the weight-responsive element. The valve means may comprise two shutters one of which controls the main feed and the other of which acts to cut off the feed completely.

The inner angular corners of the compartments may be filled by a central body around the pivot axis of the compartment, such body providing a downwardly and forwardly sloping surface when the particular compartment is retained in position at the loading station. With the compartment in this position the material from the hopper falls on the downwardly and forwardly sloping surface which acts in advance of the trailing outer portion of the rear wall of the compartment to direct piling of the material on the floor of the compartment away from the pivot axis.

In the case of a rotary container divided into four compartments the central filling may be square in shape with its sides displaced to the extent of 135° about the pivot axis of the container with respect to the inner radial portions of the vanes between which such sides extend. With this construction the rotary container may be arranged with its pivot axis vertically beneath the hopper outlet, the compartment in the material-receiving position having the inner radial portions of its front and rear walls disposed horizontally and vertically respectively. The trailing outer portion of such rear wall may, with the compartment in this position, slope rearwardly at about 30° to the vertical. The foregoing applies when the rotary container is locked in position with the uppermost compartment retained at the loading station.

The rotation of the container under gravitational force may be opposed by a braking torque, which is conveniently provided by a rotary hydraulic brake driven by the container. This ensures that a compartment approaches its retained position at the loading station at a controlled rate, and the valve means may be controlled to commence feeding material to the compartment before it is stopped at the loading station. When the feed into a compartment commences the outer portion of the rear wall of that compartment may, for example, lie directly below the hopper outlet and at an angle of 50° to 60° to the vertical.

The invention also includes a method of weighing discrete predetermined quantities of material and according to the invention such method comprises the steps of presenting a series of receptacles singly in succession at a loading station, feeding said material into one of said receptacles while retaining the latter at the loading station, producing movement of a weight-responsive element in response to the weight of material so loaded, and as a result of said movement releasing the retained receptacle and bringing about an indexing movement in which the next succeeding receptacle is presented at the loading station and the material which has been loaded is discharged from the loaded receptacle.

The invention will now be described by way of example with reference to the accompanying drawings, which illustrate a weighing machine according to the invention and in which.

Figure 2:
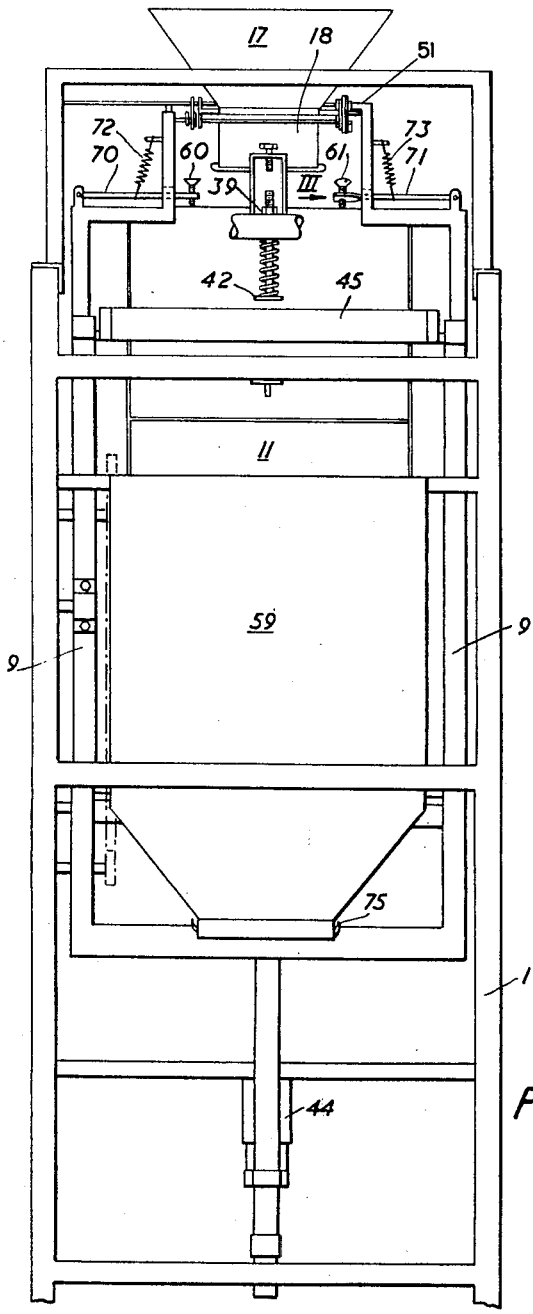
FIGURE 2 is a right hand side view corresponding to FIGURE 1.
Figure 3:
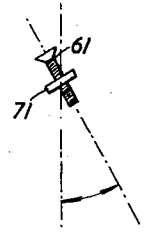
Figure 4:
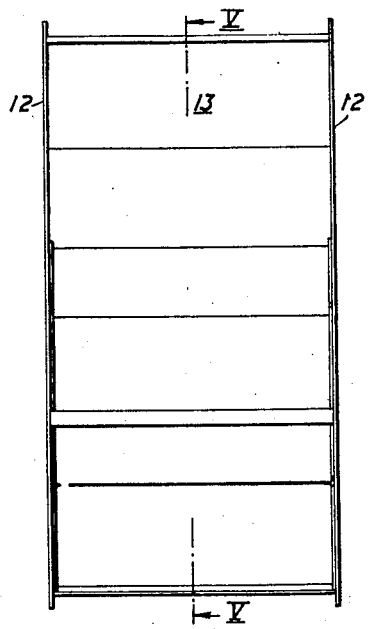
Figure 5:
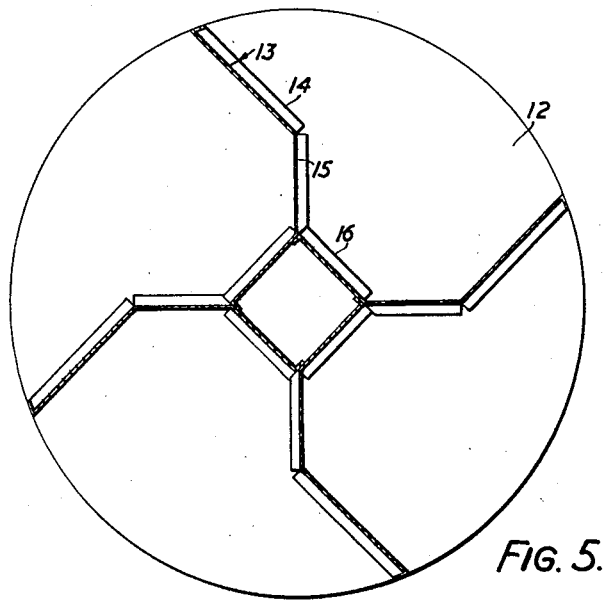
Figure 9:
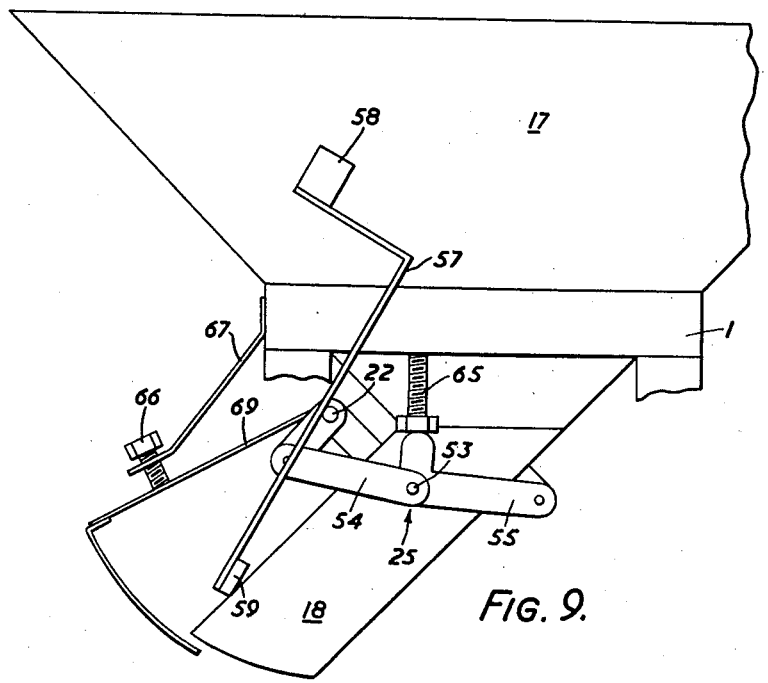
Figure 10:
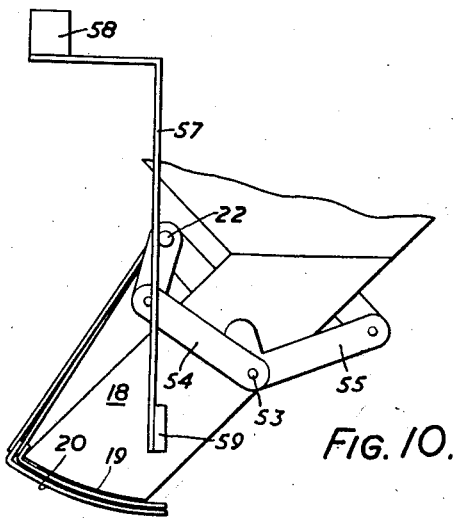
Figure 11:
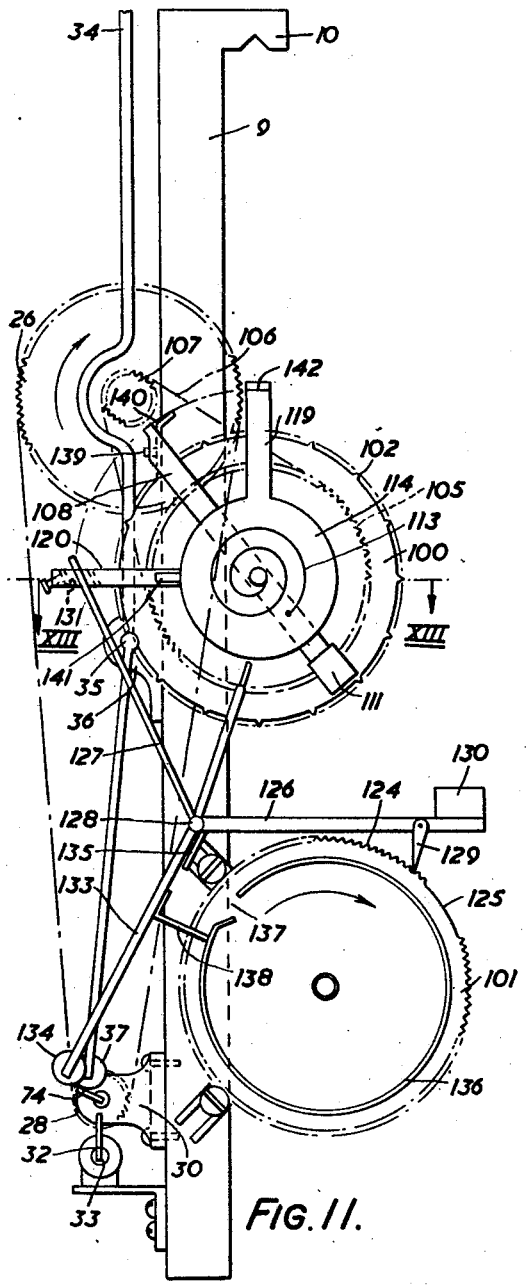
Figure 12:
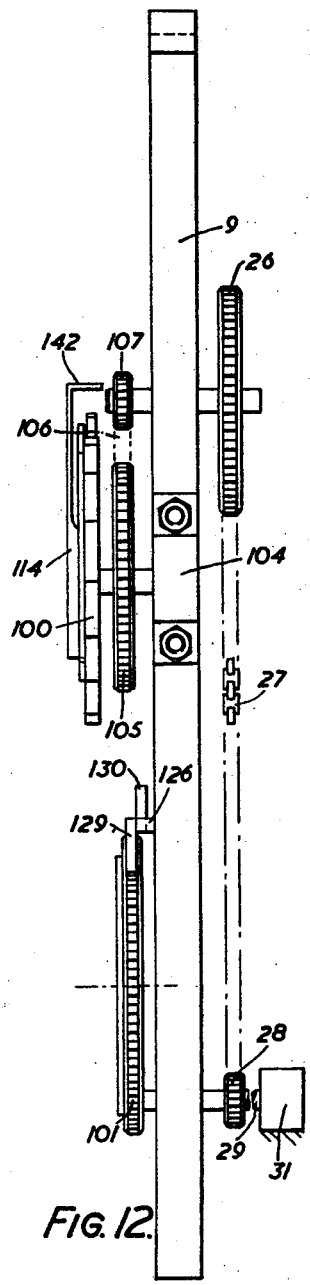
Figure 13:
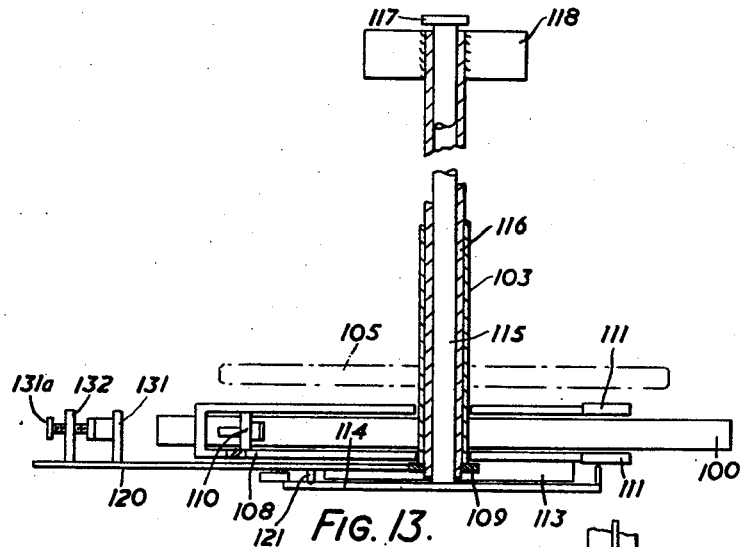
Figure 15:
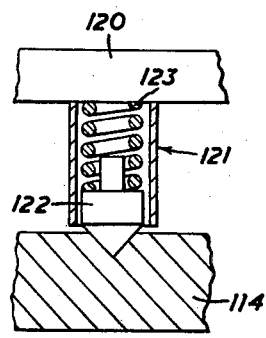
Figure 14:
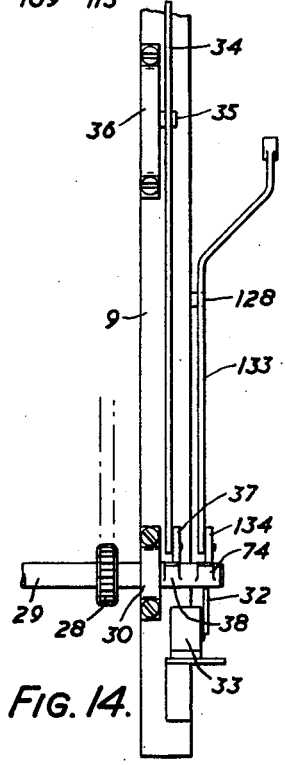

FIGURE 3 is a detail fragmentary view taken in the direction III shown in FIGURE 2, FIGURE 4 is a detail side view of a part of the machine, FIGURE 5 is a sectional view along the line V—V of FIGURE 4, FIGURE 6 is a detail fragmentary left hand side view of the machine, FIGURES 7 and 8 are detail rear views which correspond to parts of FIGURE 6, FIGURES 9 and 10 are detail front views which also correspond to parts of FIGURE 6, FIGURE 11 is a detail front view of a further part of the machine, FIGURE 12 is a right hand side view corresponding to FIGURE 11, FIGURE 13 is a sectional view along the line XIII—XIII of FIGURE 11, FIGURE 14 is a left hand side view corresponding to FIGURE 11, and FIGURE 15 is a detail view of part of FIGURE 13.

Figure 1:
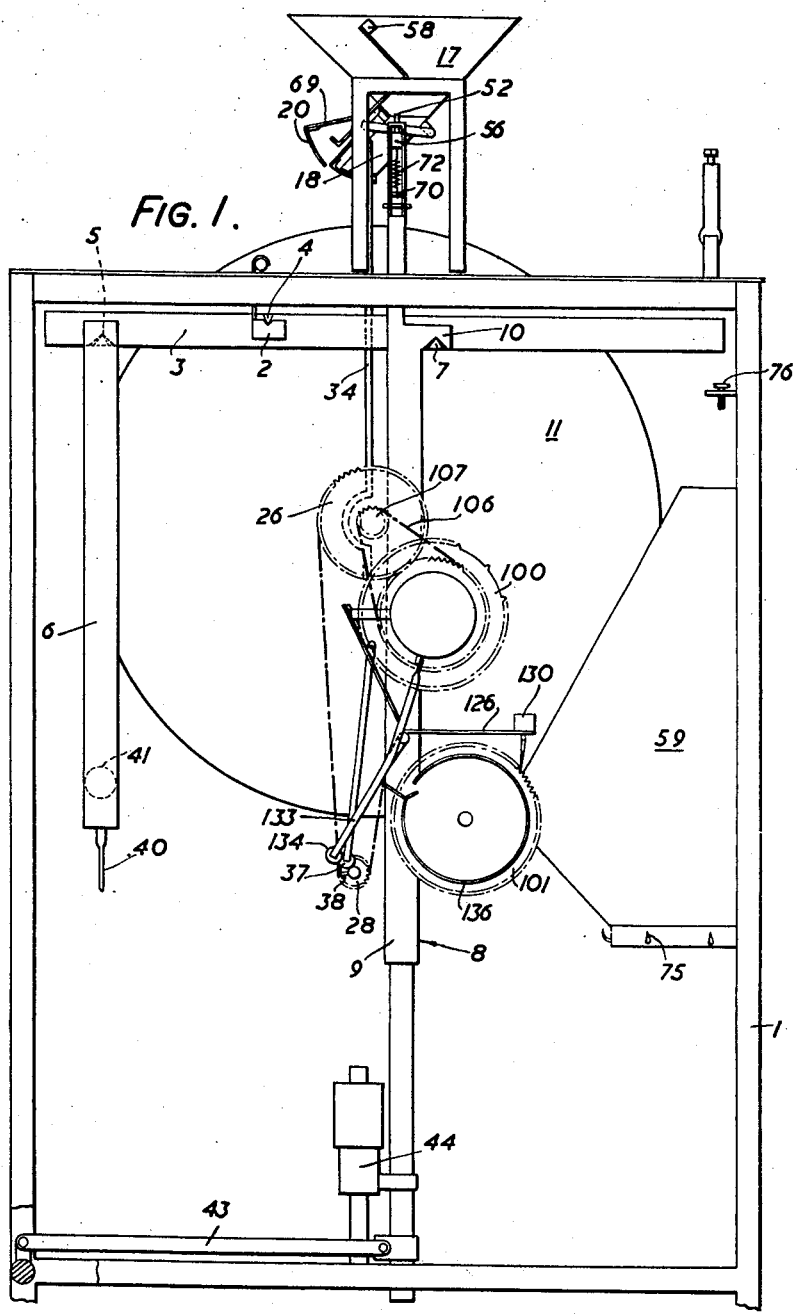
FIGURE 1 is a front view showing the general arrangement of the machine.

A framework 1 of the machine carries, on two aligned V blocks 2 which are oppositely disposed respectively at the front and rear of the framework, a weigh-beam 3 provided with a pair of similarly aligned downwardly facing knife edges 4 which bear on the blocks 2, as shown more particularly in FIGURES 1 and 2. The weigh-beam comprises a rectangular frame whose major axis is disposed laterally of the machine. Projecting outwardly from the beam 3 near to its left hand end are a pair of knife edges 5 aligned on a fore-and-aft axis and on which freely hangs a counterbalance and weight supporting frame 6. A pair of similarly arranged knife edges 7 project from the beam 3 along a fore-and-aft axis disposed slightly to the right of the centre of the beam, the two pairs of knife edges 5 and 7 being equi-distant from, and disposed on opposite sides of, the pair of knife edges 4. An upright frame 8 which has two side members 9 disposed respectively in front of and behind the beam 3 is supported on the knife edges 7 by rightwardly extending spurs 10 of the members 9. The arrangement is such that the frame 8 lies in a fore-and-aft plane disposed more or less centrally of the machine.

A rotary weighing container 11 of drum-like form is rotatably mounted about a fore-and-aft horizontal pivot axis in a pair of bearing blocks mounted respectively on the left hand sides of the two members 9. The drum 11, which is shown more particularly in FIGURES 4 and 5, comprises two circular side plates 12 and a plurality of substantially radial vanes such as 13 which are equiangularly separated from each other about the pivot axis of the drum and are bolted to the side plates 12 to form four substantially sector-shaped compartments. Each of the vanes 13 is formed with three plane mutually inclined portions such as 14, 15 and 16. The inner portions 15 of the four vanes are disposed in the corresponding radial planes of the drum, whilst the innermost portions 16 are displaced to the extent of 135° about the pivot axis of the drum with respect to those radial planes. The four portions 16 of the vanes are bolted together to form a square-shaped central filling of the drum. Each outer portion 14 of the vanes 13 is displaced to the extent of 45° with respect to the corresponding radial plane in the anti-clockwise direction.

A hopper 17 adapted to contain a supply of material to be weighed and formed with inclined walls and an outlet 18 is supported on the framework 1, at a loading station at which a compartment is retained while being loaded and with the outlet disposed directly above the pivot axis of the drum 11. The supply of the material through the outlet 18, and into one of the four drum compartments which is so retained, is controlled by valve means comprising a pair of arcuate shutters 19 and 20, shown more particularly in FIGURES 6 to 10, which respectively provide a main feed and a dribble feed of the material from the outlet 18. A pair of aligned pivotally mounted shafts 21 and 22 respectively carry the shutters 19 and 20, and the shutter 19 cooperates with the whole flow area of the outlet 18 and has a small cut-away portion 23 through which the dribble feed occurs. The cut-away portion 23 is blanked off by closure of the shutter 20 which in its closed position partially overlaps the shutter 19. Toggle linkages 24 and 25 respectively control the opening and closing movements of the shutters 19 and 20 and these toggles are controlled, in a manner which will be described later, by movement of the frame 8.

Mounted on the spindle of the drum 11 is a sprocket 26 which is connected through a chain 27 to a coplanar sprocket 28 which is disposed behind the front member 9 and fixed on a horizontal shaft 29 which is disposed fore-and-aft of the machine and rotatably mounted in two aligned bearing blocks 30 mounted on the members 9 of the frame 8, see FIGURES 11, 12 and 14. Mounted at the rear of the frame 8 and driven by the shaft 29 is a hydraulic brake 31 which, on rotation of the shaft 29, acts to pump a hydraulic fluid around a closed circuit through an adjustable flow restrictor and thus exerts an adjustable braking torque on the drum 11. The number of teeth on the sprocket 26 is four times that on the sprocket 28 so that the latter makes one complete revolution for a quarter revolution of the drum, i.e. a partial rotation of the drum which will remove one drum compartment from the loading station beneath the outlet 18 and replace it by the next following compartment. An actuating member 32 of a counter 33 mounted on the frame 8 cooperates with a radial projection 74 from the shaft 29 in front of the front member 9 once during each revolution of the shaft 29 in such a manner that the number of revolutions made by that shaft 29, and hence the number of quarter revolutions of the drum 11, are indicated by the counter. A trip arm 34 is pivoted at 35 on a pivot block 36 mounted on the right hand side of the front member 9 and carries at its lower end a roller 37. In its free resting position the trip arm 34 hangs with the roller 37 in the position shown in FIGURE 11, in which it abuts another radial projection 38 of the shaft 29 to prevent further clockwise rotation of the sprocket 28 and hence of the drum 11. When the drum is so locked in position by the roller 37 one of the compartments of the drum is retained at the loading station below the hopper outlet 18, with the inner portion 15 of the left hand vane, which forms a rear wall of that compartment, disposed in a substantially vertical radial plane directly below the outlet 18.

With the drum locked in such a position material to be weighed, for example corn, flows from the hopper 17 through the outlet 18 into the compartment of the drum 11 which is disposed immediately beneath it. The material strikes the inclined outer portion 14 of the left hand vane of that compartment, and it is deflected thereby to the right of the drum axis so that it piles up on the opposite vane of that compartment. As it piles up in the compartment in this manner it exerts a torque tending to rotate the drum 11 in a clockwise direction and this torque is resisted by the abutment of the projection 38 on the roller 37.

The weight of material in the compartment also produces a torque tending to tilt the beam 3 clockwise on the knife edges 4 and this torque is resisted by a weight which is hung on a hook 40 disposed centrally at the bottom of the frame 6, see FIGURE 1. The weight on the hook 40 is chosen according to the weight which it is desired to weigh in each compartment of the drum 11, and, due to the equi-distant spacing between the knife edges 4 and 5, and the knife edges 4 and 10, is equal thereto. The frame 6 is formed with a counterbalance weight 41 which, together with the weight of the frame itself, exactly counterbalances the weight of the frame 8 and all its attachments, hence the only torque tending to tilt the beam 3 which the weight on the hook 40 has to resist is that resulting from the weight of material in the drum 11.

As the weight of material in the drum increases to a value a few pounds less than the weight on the hook 40, this difference depending on the distance of the knife edges 4 from the plane containing the knife edges 5 and 10, the beam 3 will commence to tilt clockwise from its normal resting position. In its normal resting position the beam 3 is inclined anti-clockwise from the horizontal by the weight on the frame 6, and rests against a spring loaded stop 42 which is fixed to the framework 1 and cooperates with the upper surface of a crosspiece 45 at the right hand end of the beam 3. As the beam 3 tilts, the frame 8 which rests on the knife edges 7 moves downwardly with it, this downward movement being guided by a link 43 which is pivotally supported between the framework 1 and the frame 8 near to the lower end of the latter. This link 43 prevents swinging of the frame 8 as the drum 11 is filled and emptied so that it remains more or less vertical through its range of movement. Movement of the frame 8 is damped by a hydraulic dashpot 44 which is operatively disposed between the framework 1 and the frame 8.

As the frame 8 moves downwardly a projection 51 at the upper end of the rear member 9 of the frame 8 displaces downwardly a projection 46 of the right hand element 47 of the toggle 24. This releases the toggle 24, which is shown in its locked position with the shutter 20 open in FIGURE 7, and allows the main shutter 19 to be closed by a tension spring 48 whose lower end is connected to the framework 1 and whose upper end is connected to a lever 49 which is fixed on the shutter shaft 21 and to which the left hand element 50 of the toggle 24 is pivotally connected. The disposition of the toggle 24 when the shutter 20 is fully closed is as shown in FIGURE 8. The stop 42 is adjusted by means of a nut 39 so that it leaves the beam 3 as the shutter 19 closes.

After the shutter 19 closes a dribble feed into the uppermost compartment of the drum 11 occurs through the cut-away portion 23, and thus the weight of material in that compartment increases comparatively slowly. This dribble feed continues until the beam 3 reaches its horizontal position, when the spacing between the knife edge 4 and the plane containing the knife edges 5 and 7 is of no effect and the weight of material in the uppermost compartment of the drum 11 exactly balances the weight which has been placed on the hook 40. As the beam 3 passes through its horizontal position a stop element 52 mounted at the upper end of the front member 9 of the frame 8 contacts a forwardly projecting pivot pin 53 which at its rear end pivotally interconnects left hand and right hand elements, 54 and 55 respectively, of the toggle 25 and opens this toggle to allow the smaller shutter 20 to close under the influence of gravity and cut off the dribble feed through the shutter 19. The pin 53 is accommodated in a vertically elongated aperture 56 of the front member 9 of the frame 8 and has sufficient clearance therein to allow rapid closing of the shutter 20 independently of further downward movement of the frame 8, after the toggle 25 has been tripped. The trip element 52 is screw threaded into the upper end of the front member 9 so as to project downwardly into the aperture 56, and this provides an adjustment whereby the vertical position of the frame 8 at which the toggle 25 is tripped may be varied. Means are provided, such as a lock nut, which enables the member 52 to be locked in its adjusted position.

A trip arm 57 which swings in a vertical plane is mounted intermediate its ends on the shutter shaft 22 and carries at its upper end a counterweight 58. In the normal open position of the shutter 20, as shown in FIGURE 9, the weight 58 is disposed more or less directly above the shaft 22 and hence its effort on that shaft is negligible. As the shutter 20 is closed, after the toggle 25 is tripped, the arm 57 swings with the shaft 22 so that the weight 58 moves progressively further to the left of the shaft 22 and assists in the rapid closing of the shutter 20. At its lower end the arm 57 carries an abutment pad 59 which, as the shutter 20 closes, strikes the upper end of the trip arm 34 to displace the latter clockwise about its pivot at 35 and move the roller 37 leftwardly clear of the projection 38.

The arrangement is such that the roller 37 clears the projection 38 just as the shutter 20 reaches its fully closed position, when the parts associated with the shutter 20 take up the dispositions shown in FIGURE 10. The drum 11 is now free to rotate under the torque exerted by the material which has been supplied from the hopper 17, and it rotates clockwise at a speed determined by the adjustment of the hydraulic brake 31. This rotation of the drum brings the compartment which has been filled to a position at which the material is tipped therefrom and the machine is provided with a sack feeder 59, comprising a chute with inclined walls and provided at its base with a row of hooks such as 75 on which a sack may be hung, so arranged that it will catch the material as it is tipped from the drum and lead the material down into the sack. When tipping is completed the sack may be removed and replaced by an empty sack. Downward movement of the frame 9 is limited by an adjustable stop 76 mounted on the framework 1 below the right hand end of the beam 3.

As material is tipped from the drum the weight on the frame 8 is correspondingly decreased and the frame 8 rises, under the influence of the weight on the hook 40, at a rate depending upon the dash pot 44 and the rate at which material is tipped from the drum. As the frame 8 rises two adjustable striker screws 60 and 61, carried respectively by the front and rear members 9, and shown in FIGURE 2, act on the toggles 25 and 24 to open the shutters 20 and 19 and move the toggles past dead center into their locked positions. In achieving this the striker 60 acts directly on the toggle element 54 underneath the pivot 53, whilst the striker 61 acts directly on a roller 63 pivotally mounted underneath the toggle element 47 at some distance from the pivotal connection of the latter with the toggle element 50. The movement of the toggles 24 and 25 into their locked positions is limited by adjustable stop screws 64 and 65 mounted on the hopper 17 and which respectively abut the toggle elements 47 and 55. Stop screws 66, one of which is shown in FIGURE 9, are mounted on an arm 67 which is mounted on the framework and may be adjusted to limit the movement of the shutters 19 and 20 into their open positions. These stop screws 66, which are adjustable in the arm 67, abut individually on arms 68 and 69 by which the shutters 19 and 20 are respectively mounted on their shafts 21 and 22. Opening of the shutter 20 releases the trip arm 34, which then swings to its normal position in which the roller 37 is in a position for engagement with the projection 38 of the shaft 29. The brake 31 is adjusted so that the roller 37 is returned to its normal position before the drum 11 has completed a quarter revolution and hence is ready to engage the projection 38 at the end of this quarter revolution to lock the drum 11 in a position in which the next compartment to the one which has just been tipped is retained at the loading station directly below the hopper outlet 18.

The strikers 60 and 61 are adjustably disposed at the inner ends of spring loaded striker arms 70 and 71 whose outer ends are pivoted respectively to the front and rear members 9. The inner ends of the arms 70 and 71 are urged upwardly by tension springs 72 and 73, and the strikers 60 and 61 are adjusted so that their spring loading is sufficient to bring about locking of the toggles 24 and 25, and also so that the shutters will not commence to open and allow material to be fed from the hopper 17 until the compartment next following the one which has just been filled is suitably disposed below the outlet 18. Normally the adjustment is such that the feed commences somewhat before the drum comes to rest in its locked position, for example when the outer portion 14 of the rear vane 13 is inclined at an angle of 50° to 60° to the vertical. As shown more particularly in FIGURE 3 the striker 71 is angled so that its axis, along which it is adjustable, is inclined at 30° to the vertical and is so arranged that it exerts a side thrust on the roller 53 and only a small clearance is necessary between it and the roller, and hence only a small downward movement of the frame 8 must be allowed for, before it is in a position where it will not foul the roller 63 during closing movement of the shutter 19. Hence only a small displacement of the beam 3 need occur from its normal resting position before the projection 51 trips the toggle 24 to cause rapid closing of the larger shutter 19 under the influence of the tension spring 48. The abutment of the projection 38 on the roller 37 defines the end of a weighing cycle and, subject to the overriding control of a counting mechanism hereinafter described, the cycle will be repeated by the described weighing mechanism until the machine is stopped. Once during each quarter revolution of the drum 11 the projection 74 rocks the actuating member 32 and the counter 33 registers one tip of the drum 11.

As mentioned earlier the operation of the machine is under the control of a counting mechanism, and this is mounted on the front member 9 of the frame 8 and incorporates a units control wheel 100 and a multiplier control wheel 101, shown more particularly in FIGURES 11, 12 and 13. The control wheel 100 is formed on its outer periphery with sixteen equiangularly disposed projections 102 and is fixed to a horizontal bearing sleeve 103 which rotates about a fore-and-aft axis in a bearing block 104 fixed to the righthand side of the front member 9. The wheel 100 lies in front of the front member 9 behind which, also fixed to the sleeve 103, lies a sprocket 105. A chain 106 couples this sprocket to a smaller coplanar sprocket 107 which is non-rotatably fixed to the spindle of the drum 11 and provides a drive such that the control wheel 100 makes one complete revolution for four complete revolutions of the drum 11. Thus a partial revolution of the control wheel 100 which is equivalent to the angular spacing between any two adjacent projections 102 is equivalent to a quarter revolution of the drum 11, i.e. a part revolution of the drum 11 which corresponds to one complete weighing cycle of the machine.

A control stirrup 108 is disposed with its limbs lying one on either side of the wheel 100 and extending diametrically thereof, being rotatably mounted intermediate its ends on the sleeve 103. At its upper end as shown in FIGURE 11 the stirrup 108 carries a pawl mechanism 110 which is disposed close to and in the plane of the wheel 100 so that its pawl may cooperate with the projections 102. At its opposite end the stirrup 108 carries a counterweight 111 on each of its limbs which counterbalance the weight of the pawl mechanism 110. A coil spring 113 whose inner end is attached to the sleeve 116 has its outer end attached to the front limbs of the stirrup 108 and tends to pivot the latter in an anti-clockwise direction. Thus if the stirrup 108 is positioned relatively to the wheel 100 with its pawl engaging with a corresponding one of the projections 102 on the clockwise side thereof, such engagement will be maintained by the coil spring 113. A units control disc 114 is fixed to the forward end of a spindle 115 which is rotatably mounted coaxial with the sleeve 103 within a further bearing sleeve 116 which is itself rotatably mounted within the bearing sleeve 103. This disc 114 is of circular form and is provided on its front face, adjacent its periphery, with graduations corresponding to the disposition of the projections 102 on the wheel 100. The spindle 115 is rearwardly flanged at 117 and the sleeve 116 is welded to a bracket 118 which is mounted on the rear member 9, whilst an internally threaded flange 109 is screwed on the forward end of the sleeve 116; this arrangement axially locates both the spindle 115 and the sleeve 103 and provides transverse alignment of the latter. The disc 114 is formed with a radially projecting arm 119 corresponding in angular position to its zero graduation and slightly longer than the pawl carrying end of the stirrup 108. The pawl mechanism 110 has a projection 140 which, when it is struck by the inturned outer end 142 of the arm 119, releases the pawl from the projection 102 with which it is engaged. Striking of the projection 102 by the arm 119 in this manner sets the pawl mechanism 110 in an inoperative condition. Mounted on the flange 109 at the forward end of the sleeve 116 and radially extending therefrom is a release arm 120 which carries a detent assembly 121 which has a detent 122 urged forwardly by a compression spring 123 into engagement with the rear face of the disc 114. The detent 122 cooperates with a series of suitable depressions formed in the disc 114 and situated on a corresponding pitch circle and corresponding in position and number to the graduations of the disc 114.

The control wheel 101 is rotatably mounted on the right hand side of the front member 9 below the control wheel 100 and is formed around its periphery with one hundred ratchet teeth such as 124 which occupy all of the periphery except a small portion 125 which is left smooth. A bell crank having a lower arm 126 and an upper arm 127 is mounted on a pivot 128 projecting from the front face of the front member 9. The lower arm 126 extends more or less horizontally from the pivot above the control wheel 101 and carries near its outer end a pawl 129 which cooperates with the ratchet teeth 124 and is urged into positive engagement therewith by a counterweight 130 mounted at the end of the arm 126. The arm 127 is upwardly inclined and lies to the left of the control wheel 100, passing immediately behind and close to the outer end of the arm 120. Mounted on the arm 120 close to its outer end is an adjustable inclined stop 131 which may be adjusted by means of a screw 131a mounted in a rearwardly projecting bracket 132 on the arm 120. This adjustment enables the normal spacing between the arm 127 and the top 131 to be varied, and this spacing is sufficient for the bell crank to be rocked anti-clockwise through a sufficient angle to allow the pawl 129 to clear the ratchet teeth 124.

A release lever 133 is pivoted intermediate its ends on the pivot 128 and at its lower end carries a roller 134 which cooperates with the radial projection 74 of the shaft 29 in a manner similar to that which has previously been described in connection with the roller 37 and projection 38. A downwardly inclined projection 135 from the lower arm 126 of the bell crank lever which carries the pawl 129 underlies the lower limb of the lever 133 close to the pivot 128 and is so disposed that, when the disposition of the parts is such that the pawl 129 is in engagement with the control wheel 101 as shown in FIGURE 11, the lever 133 rests on the projection 135 with the roller 134 held clear of the projection 74 so that the counting mechanism exerts no immediate influence on the operation of the machine.

Close to its periphery the front face of the control wheel 101 is provided with an upstanding annular flange 136 which is provided with a cut-away portion at 137.

Mounted on the lever 133 is a bracket with a flange 138 which is directed more or less radially towards the control wheel 101. The arrangement is such that when the pawl 129 is idling on the untoothed portion 125 the flange 138 is disposed opposite to the cut-away portion 137 and the position of the arm 133, which is urged anti-clockwise about the pivot 28 by gravity, depends solely upon the position of the projection 135 on which it will rest. When the pawl 129 is in engagement with any of the ratchet teeth 124 the flange 138 will, independently of the position of the projection 135, engage with the outer periphery of the flange 136 so that the roller 134 is held clear of the corresponding radial projection 74 of the shaft 29, and again the counting mechanism exerts no immediate influence on the operation of the machine.

The operation of the counting mechanism and the manner in which it exerts an overall control of the machine will now be described. Before commencing a weighing operation, or a sequence of weighing operations, the units control disc 114 and the multiplier control wheel 101 are set by hand in the following manner. If it is desired to carry out a series of repeat weighing cycles which is less than fourteen the control disc 114 is set with its corresponding graduation aligned with the arm 120, and will then be retained in this position by the detent 122. One of the projections 102 of the control wheel 100 will be aligned with the arm 120, the construction being such that one of the projections 102 is so aligned for each stationary locked position of the drum 11, and the stirrup 108 is arranged with its pawl maintained in engagement with that projection by the coil spring 113. The control wheel 101 is set so that the pawl 129 idles on the untoothed portion 125 and the flange 138 can enter the cut-away portion 137 of the flange 136. When the machine is set in operation, as later described, the weighing mechanism will execute a series of successive weighing cycles in the manner which has already been described, each weighing cycle producing a partial revolution of the control wheel 100 which will carry with it the stirrup 108 through an angle equivalent to one graduation of the disc 114. After the execution of the desired number of complete weighing cycles, which is given by the setting of the disc 114, the projection 140 of the pawl mechanism 110 will be brought into contact with the outer end 142 of the arm 119, which as described earlier corresponds in position to the zero graduation of the disc 114. This releases the pawl of the pawl mechanism 110 from the projection 102 with which it is engaged and the stirrup 108 flies back under the control of the coil spring 113 and strikes the arm 127 rocking the latter, and with it the arm 126 and projection 135, anticlockwise into engagement with the stop 131. This movement of the projection 135 allows the roller 134 to swing into a position in which it can engage the projection 74 to prevent further operation of the weighing mechanism. Thus the weighing mechanism will perform a number of complete weighing operations which is predetermined by the setting of the units control disc 114. The arrangement is such that the counting mechanism operates slightly before the end of the last weighing cycle to bring the roller 134 into a position to prevent further operation of the machine when that weighing cycle is completed. A starting mechanism is provided which is not illustrated and which is operated to rock the release lever 133 clockwise to move the roller 134 clear of the projection 74 when it is desired to commence a further series of weighing cycles. This allows the machine to start a fresh weighing cycle, the pawl of the stirrup 109 being picked up by the projection 102 which is aligned with the arm 120 so that the stirrup 108 is carried away from and releases the arm 127, to allow the latter and with it the projection 135 to be swung clockwise by the counterweight 130 so that the roller 134 is once more held clear of the projection 74 and repeated cycling of the weighing mechanism occurs until the stirrup 108 once more strikes the arm 109. At the end of each series of weighing cycles operation of the starting mechanism will bring about the commencement of a further series and, as long as the setting of the control disc 114 remains unchanged, each series will contain the same number of cycles shown by the setting of the disc 114. In order that the pawl of the mechanism 110 may be in an operative position for engagement by a corresponding projection 102 at the start of each series of weighing cycles, that mechanism is provided with a reset element 139 which, at the end of each series, strikes the arm 127 to bring about a resetting of the pawl from its inoperative position in which it has previously been set as a result of the release arm 140 striking the projecting arm 119 of the disc 114.

If it is desired to perform a greater number of weighing cycles than fourteen in one continuous series, the disc 114 is set to a multiplicand of the required number of weighing cycles and the multiplier control wheel 101 is set so that the pawl 129 engages with one of the ratchet teeth 124 which is disposed in a clockwise direction from the untoothed portion 125 and is numbered therefrom by the multiplier which, when associated with the aforesaid chosen multiplicand, will provide a product equal to the required number of weighing cycles. In order to assist this, graduations, not illustrated in FIGURE 13, are provided on the wheel 101 adjacent the respective ratchet teeth 124. The position of the flange 136 is now such that the flange 138 contacts the outer periphery of the former to ensure that the roller 134 is held clear of the projection 74 independently of the position of the projection 135. Operation of the starting mechanism will, in the previously described manner, cause the weighing mechanism to commence a weighing cycle and after the occurrence of a number of cycles equal to the denominator set on the disc 114 the projection 140 will strike the arm 119 to render the pawl mechanism 110 inoperative so that the stirrup 108 swings back and rocks the arm 127 anti-clockwise. As the roller 134 is held clear of the projection 74 by the flange 136 of the control wheel 101 this rocking of the arm 127 does not affect the immediate operation of the weighing mechanism which commences another weighing cycle. On striking the arm 127 the pawl mechanism 110 is reset and is picked up by an rotates with the control wheel 100 as the weighing mechanism continues recycling. However the rocking of the arm 127, and with it the arm 126, has moved the pawl 129 clear of the ratchet teeth 124, and as the stirrup 108 is carried away from the arm 127 by the wheel 100 the ratchet 129 is moved back into engagement with the ratchet teeth 124 by the counterweight 130 and this advances the control wheel 101 clockwise through an angular step corresponding to the ratchet teeth spacing. Thus the weighing mechanism will continue cycling, and at the end of each group of cycles whose number is given by the denominator setting of the disc 114 the control wheel 101 is advanced through one step, until the control wheel has been advanced through a number of steps given by the aforesaid multiplier and the pawl 129 reaches the untoothed portion 125 of the periphery of the wheel 101. As already described, in this position of the wheel 101 the flange 138 of the release lever 133 is able to enter the cut-away portion of the flange 136, and the rocking of the arm 127 which serves to bring the control wheel 101 to this position will thus also allow the roller 134 to swing into a position in which it will be engaged by the projection 74 to bring about the cessation of operation of the weighing mechanism. Thus a continuous series of weighing cycles will occur after operation of the starting mechanism, the number of cycles contained in the series being given by the product of the denominator setting of the disc 114 and the multiplier setting of the control wheel 101.

If it is desired to execute a number of weighing cycles which cannot be represented as a product of a denominator obtainable on the disc 114 and a multiplier obtainable with the wheel 101, such number of cycles can be obtained in two series, one corresponding to the next lower obtainable product and the other obtained purely by a setting of the units control disc 114.

At its upper end the upper limb of the release lever 133 is disposed below and close to the periphery of the disc 114, and the latter is provided with a radial projection 141 so disposed that the disc may be manually set so that the projection 141 contacts the upper end of the arm 133 and retains the latter so that the roller 134 is clear of the projection 74. With this setting, which is used for continuous-weighing and corresponds to the zero graduation on the disc 114, the counting mechanism exerts no control whatsoever over the machine which cycles freely, the number of weighing cycles executed being registered by the counter 33.

As has been stated the maximum setting obtainable on the units control disc 114 is fourteen, even though the control wheel 100 has sixteen spaced projections 102. The reason for this is that the angle of arc occupied by the stirrup 108 and the pawl mechanism 110 reduces the operative angle of arc of the disc 114 to slightly more than that spanned by fourteen of the projections 102. Although in the illustrated embodiment the units control wheel 100 and disc 114 operate up to fourteen, and the multiplier control wheel 101 operates up to 100, these are constructional features which can be chosen so as to be suitable for the use to which the machine will be put. In an alternative form of construction which is not illustrated the shutters are closed as a direct result of downward movement of the frame 8 as has been described, but the shutters are opened as a result of rotation of the drum 11 through a predetermined angle from its locked position. This has three advantages; first that the rotational energy of the drum 11, which in the illustrated arrangement is absorbed by the brake 31, is partly utilised to open the shutters; second that the shutters can be arranged to open before the frame 8 has risen appreciably while the loaded compartment is still being tipped, thus speeding up the operation of the machine; and third, a corollary of the second, that as the next succeeding compartment is filled whilst the loaded compartment is still being tipped the beam 3 supports a greater weight during its return movement and hence any shock when the beam reaches its resting position is substantially reduced.

I claim:

1. A weighing machine comprising a rotatable container having individual compartments which define a plurality of receptacles, a hopper having an outlet for material to be weighed, a freely swinging weigh-beam on which said container is pivotally mounted for movement which presents said receptacles in succession at said outlet, means for retaining the container in position with one of the receptacles so presented, cut-off means controlling flow of said material from said outlet into the presented receptacle, a control linkage for said cut-off means operated directly in dependence upon movement of said weigh-beam when a predetermined weight of material has been loaded into that receptacle, and release means comprising a shaft having a radial projection and operatively connected to said container and a movable abutment which cooperates with said projection and responds to operation of said control linkage to release said retained container and bring about movement under the influence of gravity in which the next succeeding receptacle is presented at said outlet and the material loaded discharged from said container.

2. A weighing machine according to claim 1, wherein said control linkage embodies a toggle arrangement.

3. A weighing machine comprising a container in the form of a rotatable drum having individual compartments which define a plurality of receptacles, a hopper having an outlet for material to be weighed, a freely swinging weigh-beam on which said drum is pivotally mounted for movement which presents said receptacles in succession at said outlet, means for retaining the drum in position with one of the receptacles so presented, cut-off means controlling flow of said material from said outlet and operated in dependence upon movement of said weigh-beam when a predetermined weight of material has been loaded into the presented receptacle, and further means responsive to movement of said weigh-beam which release said retained drum and bring about movement under the influence of gravity in which the next succeeding receptacle is presented at said outlet and the material loaded discharged from said drum which comprises two substantially circular side plates and a plurality of substantially radial vanes which are equiangularly separated from each other about the pivot axis of the drum to form said compartments, each of the vanes being formed with three plane mutually inclined portions the inner of which are disposed in the corresponding radial planes of the drum whilst the innermost portions are displaced angularly about the pivot axis of the drum which respect to said radial planes and are secured together to form a central filling of the drum, each outer portion of the vanes being displaced angularly with respect to the corresponding radial plane so that the outer portion is inclined rearwardly with respect to the direction of rotation of the drum.

References Cited in the file of this patent

UNITED STATES PATENTS

| | | |
|---|---|---|
| 246,750 | Gleason | Sept. 6, 1881 |
| 332,116 | Seesle | Dec. 8, 1885 |
| 341,159 | Morrison | May 4, 1886 |
| 354,423 | Kelley et al. | Dec. 14, 1886 |
| 368,310 | Simpson et al. | Aug. 16, 1887 |
| 377,278 | Simpson | Jan. 31, 1888 |
| 400,849 | Howland | Apr. 2, 1889 |
| 410,242 | Hartley | Sept. 3, 1889 |
| 422,832 | Pollard | Mar. 4, 1890 |
| 607,473 | Richards | July 19, 1898 |
| 615,494 | Richards | Dec. 6, 1898 |
| 748,055 | Driver et al. | Dec. 29, 1903 |
| 1,222,913 | Williams | Apr. 17, 1917 |
| 1,278,029 | Schaper | Sept. 3, 1918 |
| 1,507,104 | Bradburn et al. | Sept. 2, 1924 |
| 1,580,322 | Parker | Apr. 13, 1926 |
| 1,883,855 | Nagel | Oct. 18, 1932 |
| 2,613,905 | Muskat | Oct. 14, 1952 |